United States Patent [19]

Moradi-Araghi et al.

[11] Patent Number: 4,632,185

[45] Date of Patent: Dec. 30, 1986

[54] POLYMERFLOOD PROCESS

[75] Inventors: Ahmad Moradi-Araghi; Duane H. Smith, both of Bartlesville, Okla.

[73] Assignee: Phillips Petroleum Company, Bartlesville, Okla.

[21] Appl. No.: 760,804

[22] Filed: Jul. 31, 1985

[51] Int. Cl.$^4$ ............................................. E21B 43/16
[52] U.S. Cl. .................................... 166/273; 166/275; 166/274
[58] Field of Search ...................... 166/273, 274, 275; 252/8.55 D

[56] References Cited

U.S. PATENT DOCUMENTS

| | | | |
|---|---|---|---|
| 3,506,707 | 4/1970 | Miller et al. ......................... | 260/513 |
| 3,544,597 | 12/1970 | Killam .............................. | 260/332.1 |
| 3,547,899 | 12/1970 | Arit ................................... | 260/79.3 |
| 3,679,000 | 7/1972 | Kaufman ............................ | 166/273 |
| 3,898,037 | 8/1975 | Lange ................................ | 21/2.7 R |
| 3,931,089 | 1/1976 | Karl .................................. | 260/29.6 HN |
| 3,948,783 | 4/1976 | Szabo et al. ...................... | 166/274 X |
| 4,326,969 | 4/1982 | Hunter ............................... | 166/275 X |

*Primary Examiner*—Stephen J. Novosad
*Assistant Examiner*—Thomas J. Odar
*Attorney, Agent, or Firm*—A. W. Umphlett

[57] ABSTRACT

A polymerflood oil recovery process comprising the use of ammonium salts in aqueous polymer slugs to stabilize the solution viscosity of said slugs throughout a polymerflooding process in which adverse subterranean conditions are encountered, such as high temperature, high salinity and/or high concentrations of "hardness" ions.

17 Claims, No Drawings

POLYMERFLOOD PROCESS

This invention relates to the recovery of petroleum from subterranean petroleum-bearing deposits. In another aspect, this invention relates to a polymerflood process carried out in an underground hostile environment with a polymer solution containing a polymer solution viscosity stabilizer. In accordance with another aspect, this invention relates to the injection of polymer solutions containing ammonium salt solution viscosity stabilizers into subterranean oil bearing formations wherein high temperatures and/or high salinity water and/or high hardness formation waters are encountered. In accordance with another aspect, this invention relates to a polymerflood process involving the use of polymeric viscosifiers bearing pendant hydrolyzable amide groups in combination with ammonium salt solution viscosity stabilizers to suppress undesirable hydrolysis of the amide groups and thereby stabilize the viscosifying capacity of the polymeric viscosifiers.

BACKGROUND

Many synthetic polymers have been developed and used in processes for the recovery of natural resources. Generally, a desirable property is that such polymers impart to a liquid an increased viscosity when a relatively small quantity of the polymer is added, and preferably at a minimal cost. There is an increasing demand for such polymers which will withstand hostile environments including, for example, high temperatures, high salinity and high concentrations of multivalent metal cations, commonly known as "hardness ions". Various types of water soluble polymers can be used in the processes for the recovery or the treatment of natural resources.

Oil accumulated within a subterranean oil-bearing formation is recovered or produced therefrom through wells, called production wells, drilled into the subterranean formation. A large amount of such oil is left in subterranean formations if produced only by primary depletion, i.e., where only formation energy is used to recover the oil. Where the initial formation energy is inadequate or has become depleted, supplemental operations often referred to as secondary and tertiary or enhanced or post-primary recovery operations are employed. The term "enhanced" will be used herein to refer to all such operations. Although conventional waterflooding is effective in obtaining additional oil from oil bearing subterranean formations, the technique does exhibit a number of shortcomings. Foremost among these shortcomings is the tendency of flooding water to "finger" through an oil-bearing formation and to thus bypass substantial portions thereof.

In order to restrict the mobility of the flooding water to no greater than the mobility of the oil, mobility control agents have been added to increase the viscosity of the water. Suitable agents for increasing the viscosity of the flooding water are water-soluble or water-dispersible high molecular weight polymers. These polymers are susceptible to adverse effects present in some subterranean formations, such as high temperature and dissolved electrolytes, which cause the polymers to precipitate and/or to lose their viscosifying capacity. The present invention is directed to the use of a polymer solution viscosity stabilizer. The use of such a stabilizer is particularly advantageous during a polymerflood process in a subterranean formation in which the polymer solution is exposed to a hostile environment.

Accordingly, an object of this invention is to provide an improved polymerflood process.

Another object of this invention is to provide polymer solutions which exhibit good retention of solution viscosity during polymerflooding operations.

Another object of this invention is to provide a polymerflood system, including a solution viscosity stabilizer, effective in hostile environments in subterranean formations.

Other objects, aspects, as well as the several advantages of the invention will be apparent to those skilled in the art upon reading the specification and the appended claims.

SUMMARY OF THE INVENTION

In accordance with the invention, ammonium salts are used to suppress the undesirable hydrolysis of pendant amide groups on polymeric viscosifiers used during polymerflood processes in which adverse subterranean conditions are encountered, such as high temperatures, high salinity and/or high concentrations of "hardness" ions.

More specifically, in accordance with the invention, a solution viscosity stabilizing amount of an ammonium salt is present in aqueous compositions containing polymeric viscosifiers during polymerflooding of subterranean formations, particularly those exposed to hostile conditions such as high temperatures, high salinity and/or high concentrations of "hardness ions".

In a specific embodiment of the invention, in a polymerflood process involving the use of polymeric viscosifiers bearing pendant hydrolyzable amide groups frequently found to be ineffective in hard brines at elevated temperatures because of amide hydrolysis and precipitation of the polymeric viscosifier, the improvement comprises the use of aqueous polymer slugs containing a finite but effective amount of an ammonium salt to suppress the undesirable hydrolysis of pendant amide groups, thereby stabilizing the solution viscosifying capacity of the polymers, particularly under hostile environment conditions, such as temperatures above about 170 F. and greater than 500 ppm "hardness cations".

DETAILED DESCRIPTION OF THE INVENTION

As used herein the term "polymers" is used generically unless otherwise indicated to mean homopolymers, copolymers, and terpolymers and thus includes polymers prepared using any number of monomers.

The homopolymers and copolymers that can be used according to the invention are well suited for polymerflooding. The polymers that can be used in combination with solution viscosity stabilizers according to the invention are useful because such solutions exhibit significant solution viscosities even under hostile environment conditions. A hostile environment for the purpose of this application is one in which the temperature, salinity and/or hardness cation content is sufficient to cause polymer precipitation, loss of solution viscosity and/or similar adverse effects within a nominal period of time.

A hostile environment can best be viewed as one in which conventionally used thickening agents are not suitable. Polyacrylamides are such conventionally used thickening agents. A hostile environment, for example, is one wherein the reservoir temperature can be as low as 150° F. and electrolyte concentration of dissolved salts in the available water both injection water (which may be sea water) and formation water is at least about 35,000 ppm (with about 1,750 ppm combined calcium and magnesium ion), i.e., about 3.5 weight percent or higher equivalent to a salinity of about 35 grams of dissolved salts per kilogram of solution. At lower reservoir temperatures, e.g., from about 120° F. to about 150° F., a relatively higher salinity and/or content of hardness cations would create such a hostile environment, say for example, a salinity of at least about 50–100 grams of dissolved salts per kilogram of solution with a fraction of divalent hardness cations to total cations of at least about 20 weight percent.

The inventive process is applicable to polymers containing 10 to 100 weight percent monomeric units bearing pendant hydrolyzable amide groups, preferably 30 to 70 weight percent amide monomer moieties and most preferably 40 to 60 weight percent of amide bearing monomer units. Suitable polymers may contain one or more monomer units in addition to the amide bearing monomer unit.

As indicated hereinbefore, polymeric viscosifiers bearing pendant hydrolyzable amide groups have been found to be ineffective in hard brines at elevated temperatures because of amide hydrolysis and precipitation of the polymeric viscosifiers. Representative polymeric viscosifiers that can be used according to the invention include homopolymers of alpha,beta-unsaturated amides and copolymers thereof with N-vinyl lactams and vinyl-containing sulfonate comonomers.

Suitable alpha,beta-unsaturated amide monomers include those having the formula

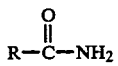

wherein R is an 1-alkenyl radical selected from ethenyl (vinyl), propenyl, isopropenyl, 1-butenyl, isobutenyl (2-methyl-1-propenyl), 1-pentenyl, 1-isopentenyl (3-methyl-1-butenyl), and 1-methyl-1-butenyl. These alpha,beta-unsaturated amide monomers are generally water-soluble or water-dispersible.

A more preferred class of alpha,beta-unsaturated amide monomers are those of the formula

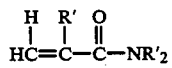

wherein each R' is individually selected from H and methyl. Especially suitable in addition to acrylamide are N-methylacrylamide and N,N-dimethylacrylamide (DMAm).

Suitable comonomers that can be polymerized with alpha,beta-unsaturated amides include N-vinyl lactams having the formula

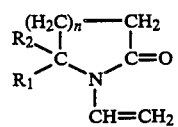

wherein $R_2$ and $R_1$ are selected independently from the group consisting of hydrogen, methyl and ethyl and n is an integer of from 1 to 3. These monomers are generally water-soluble or water-dispersible. A more preferred class of compounds are those of the formula

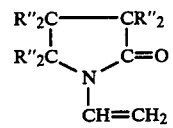

wherein R" is hydrogen, methyl or ethyl. The monomer unit presently most preferred is N-vinyl-2-pyrrolidone (VP).

The monomers presently preferred are N-vinyl-2-pyrrolidone (VP) and acrylamide (Am). For convenience, the terms VP and Am will be used to refer to the first and second monomers, respectively, in the discussion herein.

For both the N-vinyl lactam and alpha,beta-unsaturated amide, the scope can be viewed functionally as including the replacement of hydrogens with hydrocarbon groups so long as the monomer remains hydrophilic. In this disclosure, the term hydrophilic monomers refers to monomers which yield water soluble homopolymers.

The monomer weight ratios used in the preparation of the copolymers can vary rather widely. Generally, VP:Am ratios in the range from about 10:90 to about 90:10 are employed depending upon the intended application but preferably VP:Am weight ratios in the range of about 25:75 to about 75:25 are employed, more preferably from about 30:70 to about 70:30. A copolymer presently preferred for certain applications under hostile environment conditions was prepared by copolymerizing 60 parts by weight of VP and 40 parts by weight of Am corresponding to a 1:1 molar ratio. The VP:Am weight ratios of 10:90 to 90:10 correspond to molar ratios of about 6:94 to 85:15. Numerical designations such as 60/40 VP/Am indicate the relative weights of monomers charged to the polymerization zone.

Other comonomers that can be used to form polymers suitable for this invention include vinyl-containing sulfonates represented by the following formula

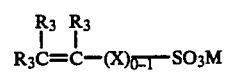

wherein $R_3$ is hydrogen, methyl, or ethyl, preferably methyl or hydrogen and provided further that at least one of the $R_3$ groups on the terminal carbon of the vinyl group is H and the other is H or methyl; M is H, Na+, K+, Li+, R'''$_4$N+, Ca++ or Mg++ and X is

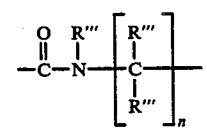

or

-continued

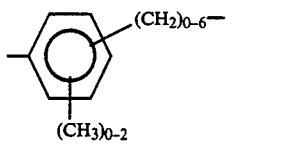

wherein n is an integer of 1-5 preferably 1-3 and R''' is H or an alkyl group containing 1-3 carbon atoms.

Examples of suitable comonomers containing sulfonate groups include:

vinyl sulfonate, sodium salt

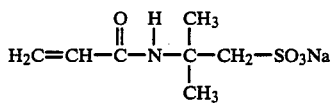

2-acrylamido-2-methylpropanesulfonate, sodium salt styrene sulfonate, sodium salt

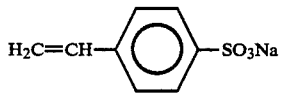

sodium vinyl toluene sulfonate

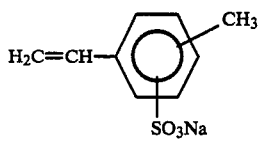

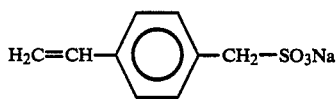

sodium p-vinylbenzyl sulfonate, and the like, and mixtures thereof.

These are known monomers and can be produced as is known in the art. Particularly with regard to the N-sulfohydrocarbon-substituted acrylamides, they are disclosed in U.S. Pat No. 3,679,000 assigned to the Lubrizol Corporation, the disclosure of which patent is incorporated by reference. The 2-acrylamido-2-methylpropanesulfonic acid is available from Lubrizol under the designation AMPS.

The polymers of this invention can be produced by solution, emulsion, inverse emulsion (water and oil) or slurry polymerization processes, all known in the art.

The polymers of this invention can be prepared by processes using various free radical polymerization initiators known to those skilled in the art. Preferred initiators include chemical polymerization initiators, the introduction of electromagnetic or nuclear radiation to generate free radicals and combinations of both techniques.

For enhanced oil recovery applications, the preferred copolymers of this invention comprise copolymers of N-vinyl-2-pyrrolidone (VP) and acrylamide (Am) in which the weight ratios of VP:Am preferably range from about 30:70 to about 70:30. The higher proportions of VP are preferred for reservoirs having more hostile conditions, e.g., higher temperature, salinity and/or hardness of the formation water.

Any suitable amount of the invention polymers can be used in the embodiments of the invention concerning the recovery and processing of natural resources. For example, in the introduction of aqueous polymer slugs into a subterranean formation in processes for enhanced oil recovery, a small but effective amount of polymer should be used to produce the desired viscosity in the injection fluid. As a general guide, the amount of polymer used will be in the range of from about 500 ppm to about 10,000 ppm, preferably 1,000 ppm to about 3,000 ppm, based on the weight of the injection fluid.

As disclosed hereinbefore, the present invention is directed to the use of ammonium salts to stabilize polymer solution viscosity during a polymerflood process in a hostile environment. A hostile environment can be viewed as one in which conventionally used mobility control agents are not suitable.

Suitable ammonium salts that can be used include inorganic as well as organic compounds containing ammonium cations. Representative examples of suitable ammonium salts that can be used include ammonium acetate, ammonium tartrate, ammonium chloride, and the like, as well as mixtures thereof. The ammonium salt stabilizer functions to suppress hydrolysis of pendant amide groups.

The amount of ammonium salt present during a polymerflood process can vary appreciably depending upon the particular polymer and the conditions of the hostile environment as well as the particular ammonium salt. Broadly, the amount of ammonium salt present will provide a sufficient concentration of ammonium cations to suppress the undesirable hydrolysis of pendant amide groups in the polymeric viscosifier. This hydrolysis is facilitated at elevated temperatures and at pH levels greater than 7. In general, suitable amounts of ammonium salts range from about 0.1 to about 30 weight percent and higher, if necessary, preferably about 1 to about 10 weight percent of the aqueous polymer solution, more preferably about 3 to about 5 weight percent. Solutions of polymers containing 80 weight percent or more of monomer units bearing amide groups require about 25 weight percent of ammonium salt to stabilize solution viscosity.

Following injection of the aqueous solution containing polymer and ammonium salt stabilizer into the subterranean formation normal post-primary operations can then be employed. For instance, a polymer solution can be injected followed by a drive fluid, as is known in the art. The water drive following the polymer slug injection will aid in driving oil from the injection well or wells toward a recovery well or wells where oil is produced.

The inventive aqueous polymer solution containing ammonium salts can also be used as a mobility buffer in a surfactantflooding operation.

For instance, a surfactant system can be injected and thereafter a mobility buffer, followed by a drive fluid as is known in the art. This mobility buffer helps to prevent fingering and enhances the sweep efficiency of the process.

One surfactant system that has been successfully used comprises broadly hydrocarbon sulfonate surfactant having an equivalent weight of about 225 to about 600. Examples of hydrocarbon sulfonates include petroleum sulfonates, olefin sulfonates and alkyl sulfonates. The preferred surfactant is a petroleum sulfonate. Petroleum sulfonates are commercially available products.

Mobility buffer solutions are aqueous solutions of thickening agents. Examples of useful mobility buffers are aqueous fluids or aqueous saline fluids containing mobility reducing agents such as high molecular weight partially hydrolyzed polyacrylamides, biopolysaccharides, cellulose ethers and the like. The mobility buffer contains 50 to 20,000 preferably 200 to 5,000 ppm of the mobility reducing agent in the fluid.

The mobility buffer fluid can be injected at a constant composition or the mobility buffer can be graded, i.e., the injection starts out at a relatively high concentration of mobility reducing agent at the leading edge and the concentration of said agent tapers off toward the trailing edge. As an example, the mobility buffer can start with a concentration of 2500 ppm of polyacrylamide in the water and end with 250 ppm of polacrylamide in water. These mobility buffer fluids are well known in the art.

A suitable drive fluid can be injected into the formation subsequent to injection of the mobility buffer. The drive fluid can be fresh or salt water or other aqueous fluids compatible with an oil-bearing formation as known to those skilled in the art.

The following specific examples will serve to illustrate this invention but are not to be considered limiting.

EXAMPLE 1

A series of runs was carried out in which the solution viscosity of an acrylamide derived polymer in a synthetic North Sea water containing varying amounts of the invention ammonium salt stabilizer, specifically ammonium acetate, was observed under thermal aging conditions. The aqueous compositions containing 2500 ppm polymer were aged one week at 300° F.

The results are summarized in the following table.

TABLE I

| | | Hostile Environment (HE) Polymers in Synthetic North Sea Water Containing Ammonium Acetate | | |
|---|---|---|---|---|
| Run No. | HE Polymer | Ammonium Acetate (Wt %) | Viscosity (cP) @ 250 F. | |
| | | | Unaged | Aged |
| 1 | VP/Am$^a$ (60/40) | 0.25 | 1.68 | 0.76 |
| 2 | Same | 0.50 | 1.78 | 1.14 |
| 3 | Same | 1.0 | 1.86 | 1.07 |
| 4 | Same | 3.0 | 1.70 | 1.48 |
| 5 | Same | 5.0 | 2.05 | 1.84 |
| 6 | VP/Am$^b$ (50/50) | 0.25 | 1.30 | 0.86 |
| 7 | Same | 0.50 | 1.35 | 1.04 |
| 8 | Same | 1.0 | 1.60 | 1.03 |
| 9 | Same | 3.0 | 1.45 | 1.49 |
| 10 | Same | 5.0 | 1.46 | 1.44 |

$^a$This VP/Am sample was 60/40 wt/wt N—vinyl-2-pyrrolidone (VP)/acrylamide (Am). Sixty parts by weight VP and forty parts by weight of Am were charged to the polymerization zone in the production of the copolymer.
$^b$This VP/Am sample was 50/50 wt/wt N—vinyl-2-pyrrolidone (VP)/acrylamide (Am). Equal weights of VP and Am were charged to the polymerization zone in the production of the copolymer.

Referring to runs 4, 5, 9 and 10 in Table I, it is evident that levels of 3 to 5 weight percent ammonium acetate were necessary to preserve all or most of the unaged solution viscosity after thermal aging.

EXAMPLE 2

Additional runs were carried out to determine the optimum amount of ammonium acetate needed to improve the aged solution viscosity of several HE polymers in synthetic North Sea water. The following table summarizes the results of these runs.

TABLE II

| | | Aged* HE Polymers in Synthetic North Sea Water Containing Ammonium Acetate | | |
|---|---|---|---|---|
| Run No. | Polymer | Ammonium Acetate (Wt %) | Viscosity (cP) @ 250 F. | |
| | | | Unaged | Aged |
| 11 | PAM$^a$ | 5 | 4.08 | 0.33# |
| 12 | Same | 10 | 3.25 | 0.41# |
| 13 | Same | 20 | 2.95 | 1.15 |
| 14 | Same | 25 | 3.36 | 1.70 |
| 15 | VP/Am$^b$ (60/40) | 0 | 1.43 | 1.02 |
| 16 | Same | 5 | 1.46 | 1.92 |
| 17 | VP/Am$^c$ (50/50) | 0 | 2.55 | 1.21 |
| 18 | Same | 5 | 1.79 | 1.92 |

*Copolymers (2500 ppm) were aged one week @ 300 F in Synthetic North Sea Water containing ammonium acetate as indicated.
In these runs a white precipitate formed (failed the test).
$^a$PAM represents a commercially available polyacrylamide.
$^b$This VP/Am sample was 60/40 wt/wt N—vinyl-2-pyrrolidone (VP)/acrylamide (Am).
$^c$This VP/Am sample was 50/50 wt/wt N—vinyl-2-pyrrolidone (VP)/acrylamide (Am).

Referring to runs 11–14 in Table II, it is evident that ammonium acetate must be present in the range of >10 weight percent and up to 25 weight percent to prevent precipitation in a commercially available polyacrylamide system and stabilize solution viscosity during the thermal aging test.

Referring to runs 16 and 18 in Table II, it is apparent that 5 weight percent ammonium acetate is sufficient to stabilize the solution viscosity of HE polymers, viz., the 60/40 and 50/50 VP/Am systems. Runs 15 and 17 are control runs, respectively, for the 60/40 and 50/50 VP/Am systems with no added ammonium acetate. These control runs (15 and 17) exhibited much lower aged viscosity values than did the inventive systems (runs 16 and 18) which contained 5 weight percent ammonium acetate.

That which is claimed is:

1. In a polymerflood process for the recovery of oil from subterranean oil reservoirs penetrated by spaced injection and production wells involving the sequential injection of aqueous polymer solution and aqueous drive wherein the polymer bears pendant hydrolyzable amide groups, the improvement is the inclusion in said polymer solution of a viscosity stabilizing amount of at least one compound capable of providing a concentration of ammonium cation sufficient to suppress hydrolysis of pendant hydrolyzable amide groups of said polymer thereby stabilizing the solution viscosity of said polymer solution.

2. A process according to claim 1 wherein said polymeric viscosifier is a polymer containing 10 to 100 weight percent monomer units bearing pendant hydrolyzable amide groups.

3. A process according to claim 1 wherein said ammonium salt is one of ammonium acetate, ammonium chloride and ammonium tartrate.

4. A process according to claim 1 wherein the viscosity stabilizing ammonium salt comprises about 0.1 to about 30 weight percent of the aqueous polymer-containing slug introduced into the reservoir.

5. A process according to claim 1 wherein said polymer is polyacrylamide or copolymer of N-vinyl-2-pyrrolidone and acrylamide.

6. A process according to claim 5 wherein the ammonium salt is ammonium acetate.

7. A process for improving the enhanced recovery of oil from subterranean oil reservoirs penetrated by at least one injection well and at least one production well by means of polymerflooding in which the polymer is exposed to a hostile environment which comprises introducing into the reservoir through an injection well an aqueous solution containing polymeric viscosifier bearing pendant hydrolyzable amide groups and an amount of at least one compound capable of providing a concentration of ammonium cations sufficient to suppress hydrolysis of pendant hydrolyzable amide groups of said polymeric viscosifier thereby stabilizing the solution viscosity of the polymer solution.

8. A process according to claim 7 wherein the ammonium salt is one of ammonium acetate, ammonium chloride and ammonium tartrate.

9. A process according to claim 7 wherein said polymer is polyacrylamide and the amount of ammonium salt ranges from about 0.1 to about 30 weight percent of the aqueous solution.

10. A process according to claim 7 wherein said polymer is a copolymer of N-vinyl-2-pyrrolidone and acrylamide and the amount of ammonium salt ranges from about 1 to about 10 weight percent of the aqueous solution.

11. A process according to claim 10 wherein said ammonium salt is ammonium acetate.

12. A process according to claim 11 wherein the amount of ammonium acetate ranges from about 3 to about 5 weight percent of the aqueous solution.

13. A process according to claim 7 wherein said polymeric viscosifier is a terpolymer containing monomer bearing sulfonate group.

14. A process according to claim 13 wherein said monomer bearing sulfonate group is sodium 2-acrylamido-2-methylpropanesulfonate.

15. A process according to claim 7 wherein a surfactant system is injected into the formation after polymerflooding and which is followed by a mobility buffer and drive fluid, to produce additional oil from the formation through producing wells.

16. A process according to claim 15 wherein said surfactant system comprises a hydrocarbon sulfonate having an equivalent weight of about 225 to about 600.

17. A process according to claim 15 wherein said mobility buffer comprises a solution of a polymer bearing pendant amide groups and viscosity stabilizing ammonium salts.

* * * * *